United States Patent [19]

Burch et al.

[11] Patent Number: 4,805,191

[45] Date of Patent: Feb. 14, 1989

[54] MODEM WITH IMPROVED TIMING RECOVERY USING EQUALIZED DATA

[75] Inventors: Richard A. Burch, Madison; Dennis B. McMahan; Harry Yedid, both of Huntsville, all of Ala.

[73] Assignee: Motorola, Inc., Schaumburg, Ill.

[21] Appl. No.: 125,312

[22] Filed: Nov. 25, 1987

[51] Int. Cl.[4] .......................... H04L 7/00; H04B 3/04
[52] U.S. Cl. ...................................... 375/11; 375/106; 328/155
[58] Field of Search ...................... 375/12, 14, 15, 106, 375/111, 11, 95, 97; 328/155; 329/50, 122; 371/42

[56] References Cited

U.S. PATENT DOCUMENTS

| | | | |
|---|---|---|---|
| 3,697,689 | 10/1972 | Gibson | 375/14 X |
| 3,962,637 | 6/1976 | Motley et al. | 375/14 |
| 4,334,313 | 6/1982 | Gitlin et al. | 375/106 |

Primary Examiner—Benedict V. Safourek
Attorney, Agent, or Firm—Charles L. Warren

[57] ABSTRACT

In a digital data receiver, it is desirable to use the equalized data for deriving time synchronization information. This invention minimizes timing contention between an equalizer operating at a T/2 rate and a timing recovery circuit which utilizes the output of the equalizer. An interpolator interpolates T1 and T2 data samples from the equalizer and provides data signals R and S equally spaced relative to the peak baud amplitude which can be easily processed by the timing recovery circuit.

10 Claims, 2 Drawing Sheets

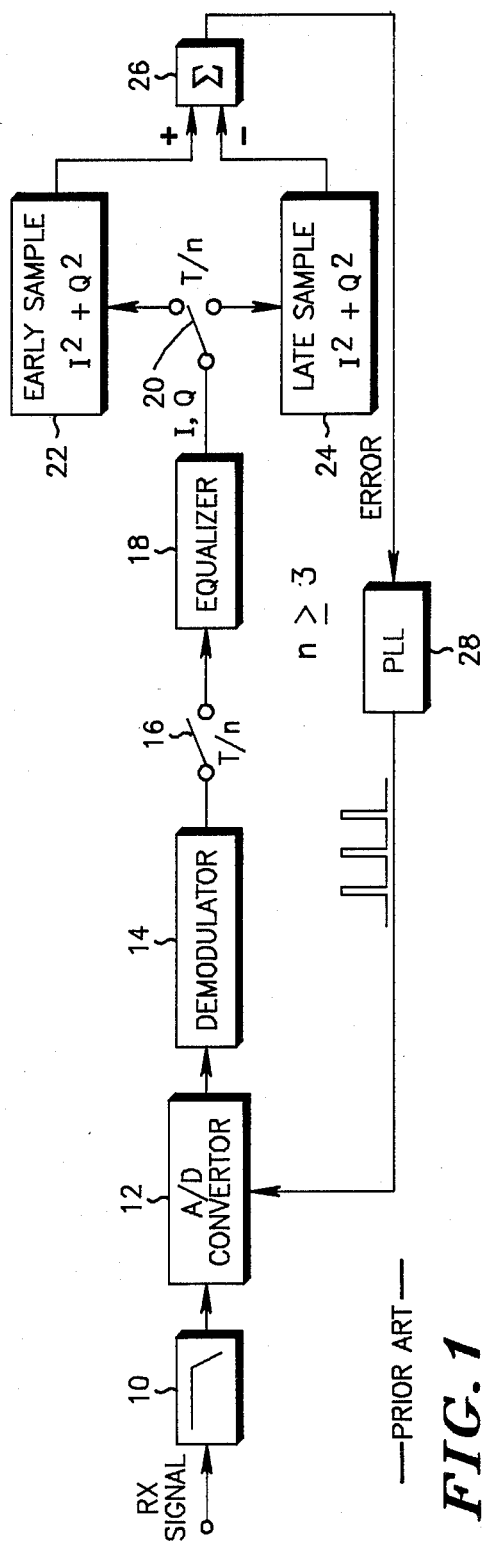
*FIG. 1* —PRIOR ART—
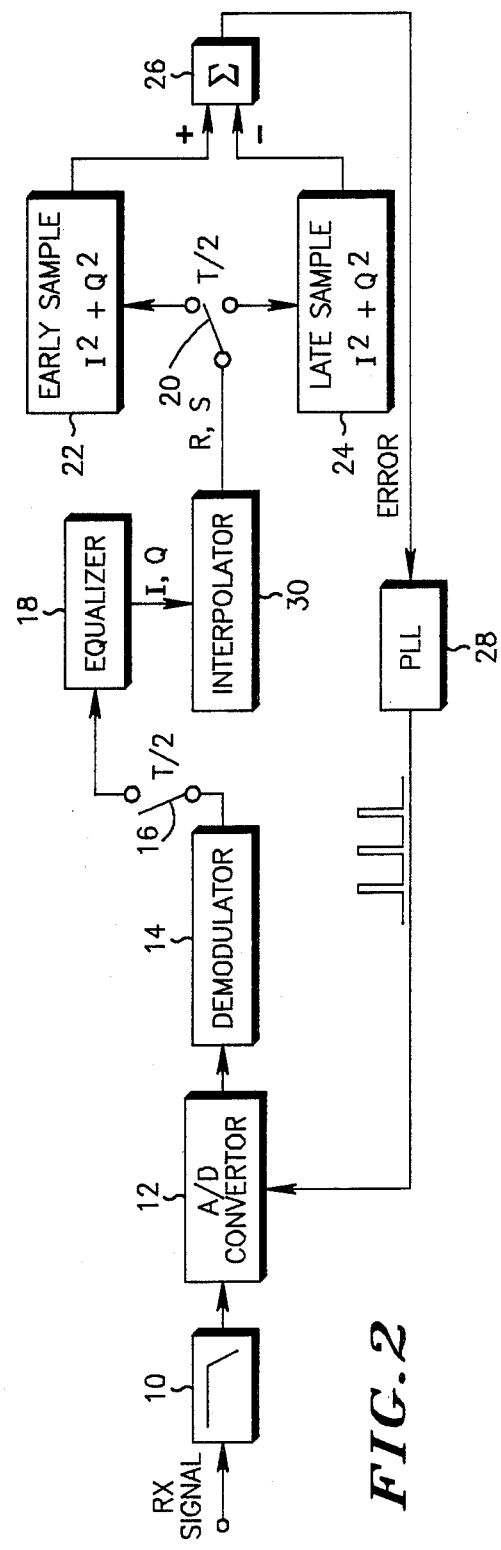
*FIG. 2*

T/3 SAMPLES

T/2 SAMPLES

MODEM WITH IMPROVED TIMING RECOVERY USING EQUALIZED DATA

BACKGROUND OF THE INVENTION

This invention is generally directed to modem timing recovery techniques and is more specifically directed to timing recovery derived from equalized data from an equalizer.

Digital modem receivers normally sample received bauds three or more times per baud in order to determine the constellation point or data being received and establish timing synchronization with the transmitting modem. Increasing the number of samples per baud normally provides better data detection at the expense of increased computational complexity or increased speed of execution. It is desirable to utilize timing recovery information based upon the more reliable equalized data as opposed to unequalized data from the demodulator. As will be explained below, using equalized data for timing recovery at a sampling rate of T/2 results in contention between the equalizer and the timing recovery circuit.

It is an object of the present invention to provide a means for substantially eliminating the contention between a T/2 equalizer and associated timing recovery circuit.

BRIEF DESCRIPTION OF THE DRAWINGS

Common reference numerals denote like elements in the figures.

FIG. 1 is a block diagram representation of a prior art modem timing recovery circuit.

FIG. 2 illustrates an embodiment of an improved timing recovery circuit according to the present invention.

DETAILED DESCRIPTION

Figure 3:
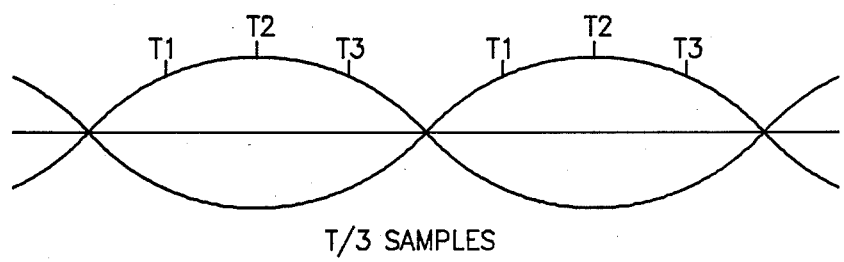
FIGS. 3 and 4 are represetative eye diagrams illustrating bauds of data with a T/3 and T/2 sample rate, respectively.

Since an important aspect of the present invention resides in the discovery of a problem relating to interaction between the equalizer and timing recovery circuits in a modem, the following description of timing recovery techniques utilizing equalized data is provided to assist in understanding the problem addressed and solved by the present invention.

FIG. 1 shows the receiver portion of a prior art modem. The received signal is filtered by low pass filter 10 before being converted from analog to digital form by A/D converter 12. Demodulator 14 acts upon the received digitized data and provides quadrature output data to equalizer 18. A sampling function of the quadrature data is provided by switch 16 which operates at a T/n rate, where T is the period of a baud ad n is the number of samples per baud. As will be explained in greater detail below, previous sampling rates have utilized at least three samples per baud ($n \geq 3$).

The purpose of adaptive equalizer 18 is to compensate the received data for distortion induced by the transmission media or lines. Equalizer 18 provides an output of equalized quadrature data I and Q which are sampled by switch 20 at a T/n rate to an early sample accumulator 22 and a late sample accumulator 24. These accumulators accumulate early and late I and Q samples relative to the magnitude peak of the baud and calculate early and late data equal to $I^2 + Q^2$. The output of the accumulators are summed by summer 26 which provides an output error signal equal to the difference between the inputs to the summer. This error signal represents the difference between the transmit baud timing and the local receiver timing. An error signal of zero indicates that no timing correction is needed; signals with a positive or negative polarity indicate that an advancing or retarding of the local receiver timing is required with the magnitude of the correction proportional to the magnitude of the error signal.

The error signal provides an input to phase locked loop (PLL) 28 which controls the sampling pulses to A/D converter 12 and hence controls the timing of the signal samples relative to the received baud rate.

It is desirable to use post-equalized data to generate the error signal since distortion introduced by the transmission lines have been compensated. However, non-equalized signals direct from the demodulator 14 can be used.

In order to more fully understand the interaction between the equalizer 18 and the timing recovery circuitry, an example is provided in whch a sampling rate of $n=3$ is utilized; refer to FIGS. 1 and 3. As seen in FIG. 3, three equally spaced samples, T1, T2 and T3 occur during each baud represented in this eye diagram. The timing of FIG. 3 would produce a zero timing error signal since the early sample T1 is equal to the late sample T3. Switch 20 routes sample T1 to early sample accumulator 22 and sample T3 to late sample accumulator 24; the peak or center sample T2 is not utilized, i.e. is is not transferred to either accumulator.

Equalizer 18 operates to provide transmission line compensation and inherently attempts to adjust the sample signal timing such that sample T2 occurs at the peak of the eye opening. Since this corresponds to the correct timing position with equally spaced early and late samples T1 and T3, the equalizer action does not interfere with the correct operation of the timing recovery circuitry. This relationship is true for sampling rates of $n \geq 3$. Normal timing recovery requires at least two samples per baud which are equally spaced on either side of the peak eye opening in order to derive an error signal for PLL 28.

Figure 4:
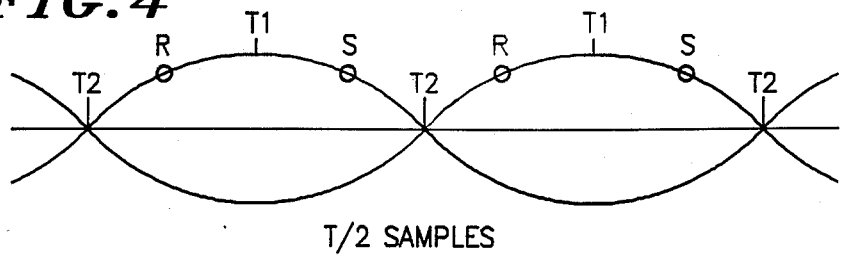

FIG. 4 illustrates a baud sample rate of $n=2$. As will be understood from the above explanation, the equalizer would attempt to place one of the samples, T1, at the peak eye opening which causes the other sample T2 to occur at the eye closing. In addition to the difficulties this would present in regard to data detection because of the magnitude of the signal at T2, this sampling pattern relative to the baud is not in accord with the timing recovery requirements wherein at least two equally spaced samples (R and S) on either side of the peak eye opening are needed. If the sampling rate of $n=2$ were selected for the circuit as shown in FIG. 1, the conflict between equalizer 18 and the timing recovery circuit would result in unstable operation due to the contention between them.

The discovery of this problem and analysis of it led to an embodiment of the present invention as shown in FIG. 2 in which the contention problem for $n=2$ is eliminated. Referring to FIG. 2, switch 16 operates at a T/2 rate. The equalized quadrature data I and Q are input to interpolator 30 which provide corresponding output data R and S which are derived from the I and Q data. The result of the interpolation provided by interpolator 30 is illustrated in FIG. 4 in which R is the calculated data point between samples T2 and T1 and S is the calculated data point between samples T1 and T2. The interpolated points R and S are equidistant either side of the peak eye opening which corresponds to sample T1.

The interpolated data points R and S are switched by switch 20 to early and late accumulators 22 and 24. Since these two data points are equally spaced relative to the maximum eye opening, the remainder of the timing recovery circuitry and timing recovery generation by PLL 28 function as previously explained in regard to FIG. 1. The use of interpolated data points when the sample rate is T/2 eliminates the contention between equalizer 18 placing a sample point at the maximum eye opening and the need of the timing recovery circuit to have an equally spaced samples about the maximum eye opening.

Figure 5:
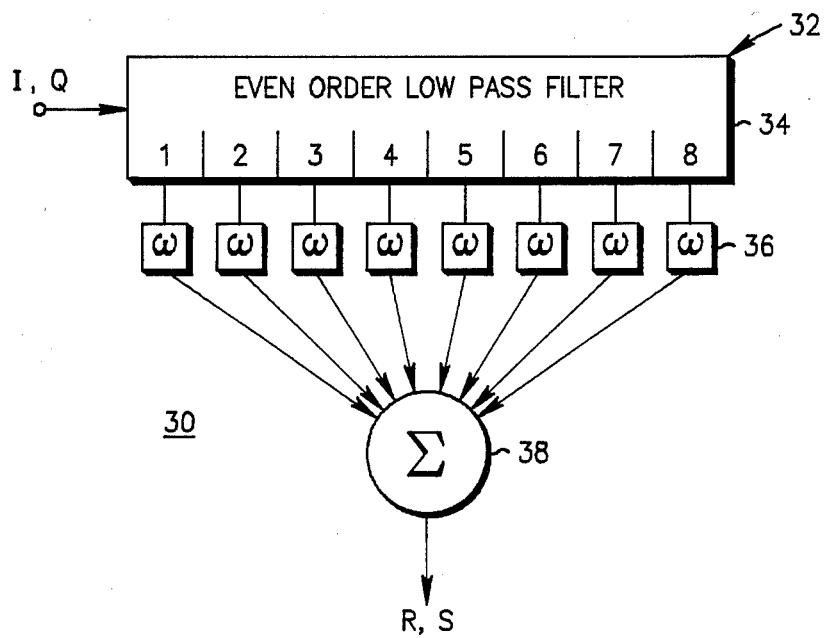
FIG. 5 is a schematic diagram illustrating an implementation of an interpolator according to the present invention.

FIG. 5 illustrates an embodiment of an interpolator 30 which consists of an even order linear phase filter which preferably is a low pass FIR filter 32 which includes a shift register 34 having an even number of stages, a plurality of weighting elements 36 corresponding to each stage, and a summation network 38 which combines the weighted outputs. The I and Q signals provide inputs to the low pass filter and the corresponding interpolated signals R and S are output. As alternating T1 and T2 samples are sifted from left to right through the even order low pass filter, the summation process results in interpolated R and S data. The illustrated even order filter 32 is an advantageous means of interpolation because of its simplicity and ease of implementation. However, it will be apparent that other methods and implementations for interpolating can be utilized.

Although the description and drawings illustrate an embodiment of the present invention, the scope of the present invention is defined by the claims which follow.

What is claimed is:

1. In a modem having an equalizer and timing means for time synchronizing the sampling of the received data with the baud rate of the received data, the improvement comprising:
   said timing means operating at a T/2 rate, where T is the baud time period, such that two samples per baud occur;
   said equalizer also operating at a T/2 rate and generating equalized quadrature data I and Q each having T1 and T2 samples during each baud where T1 and T2 are not equally spaced relative to the occurrence of the maximum baud amplitude;
   means for generating interpolated data R and S based upon said T1 and T2 samples, said R and S data being equally spaced relative to the occurrence of the maximum baud amplitude;
   said timing means utilizing said R and S data to maintain time synchronization.

2. The modem according to claim 1 wherein said generating means comprises an even order linear phase filter.

3. The modem according to claim 1 wherein said T1 and T2 samples occur at baud maximum and minimum, respectively.

4. The modem according to claim 1 wherein said timing means comprises means for generating early and late signals in response to said R and S data, means for generating an error signal in response to the difference between said early and late signals, and means for controlling the timing of the sampling in response to said error signal.

5. A digital data receiver comprising:
   means for sampling received data twice per baud;
   means for equalizing the data samples for distortion caused by the transmission media, said equalizing means generating equalized data samples in which one of the latter occurs at the center of the baud;
   means for deriving interpolated data samples from the equalized data samples, said derived samples being equally spaced in time relative to the center of the baud; and
   means for time synchronizing the sampling of the received data in response to the derived samples.

6. The receiver according to claim 4 wherein said deriving means comprises an even order linear phase filter.

7. The receiver according to claim 5 wherein said time synchronizing means comprises means for generating early and late signals in response to said derived samples, means for generating an error signal in response to the difference between said early and late signals, and means for controlling the timing of the sampling in response to said error signal.

8. A method for minimizing timing contention in a digital data receiver comprising the steps of:
   sampling received data twice per baud;
   equalizing the data samples for distortion caused by the transmission media, said equalizing means generating equalized data samples in which one of the latter occurs at the center of the baud;
   deriving interpolated data samples from the equalized data samples, said derived samples being equally spaced in time relative to the center of the baud; and
   time synchronizing the sampling of the received data in response to the derived samples.

9. The method according to claim 8 wherein said step of deriving comprises the step of even order linear phase filtering the equalized data samples.

10. The method according to claim 8 wherein said time synchronizing step comprises the steps of generating early and late signals in response to said derived samples, generating an error signal in response to the difference between said early and late signals, and controlling the timing of the sampling in response to said error signal.

* * * * *